(12) United States Patent
Hwang et al.

(10) Patent No.: US 9,374,744 B2
(45) Date of Patent: Jun. 21, 2016

(54) APPARATUS AND METHOD FOR SEAMLESS HANDOFF OF A SERVICE BETWEEN DIFFERENT TYPES OF NETWORKS

(75) Inventors: Jin-Ho Hwang, Gyeonggi-do (KR); Nak-Po Kim, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 102 days.

(21) Appl. No.: 13/206,839

(22) Filed: Aug. 10, 2011

(65) Prior Publication Data

US 2013/0039337 A1    Feb. 14, 2013

(51) Int. Cl.
*H04W 88/06* (2009.01)
*H04W 36/00* (2009.01)
*H04L 29/12* (2006.01)

(52) U.S. Cl.
CPC ....... *H04W 36/0066* (2013.01); *H04L 61/1588* (2013.01); *H04L 61/2007* (2013.01); *H04W 88/06* (2013.01)

(58) Field of Classification Search
CPC .............................. H04W 88/06; H04W 36/00
USPC .......................................................... 370/331
See application file for complete search history.

(56) References Cited

U.S. PATENT DOCUMENTS

| | | | | |
|---|---|---|---|---|
| 2007/0224988 A1* | 9/2007 | Shaheen | ................. | 455/436 |
| 2007/0238468 A1* | 10/2007 | Buckley et al. | ................. | 455/445 |
| 2008/0304451 A1* | 12/2008 | Thompson | ................. | 370/331 |
| 2009/0073936 A1* | 3/2009 | Jentz et al. | ................. | 370/331 |
| 2009/0280834 A1* | 11/2009 | Gill | ................. | H04W 60/02 455/456.5 |
| 2009/0316656 A1* | 12/2009 | Zhao et al. | ................. | 370/331 |
| 2010/0311386 A1* | 12/2010 | Edge et al. | ................. | 455/404.1 |
| 2011/0019639 A1* | 1/2011 | Karaoguz et al. | ................. | 370/331 |
| 2011/0212723 A1* | 9/2011 | Kunz et al. | ................. | 455/435.1 |
| 2011/0249652 A1* | 10/2011 | Keller et al. | ................. | 370/331 |
| 2012/0082136 A1* | 4/2012 | Dutta et al. | ................. | 370/331 |

(Continued)

FOREIGN PATENT DOCUMENTS

| | | | | |
|---|---|---|---|---|
| EP | 2020793 A1 | 2/2009 | | |
| KR | WO 2008117966 A1 * | 10/2008 | ........ | H04W 36/0022 |

(Continued)

*Primary Examiner* — Hassan Kizou
*Assistant Examiner* — Deepa Belur
(74) *Attorney, Agent, or Firm* — IP Legal Services, LLC (57) ABSTRACT

Apparatus and method for seamless handoff of a service between different types of networks. The system may include a first user equipment, a second user equipment, a first network, a second network, and an application server. The first user equipment and the second user equipment may be configured to communicate with each other initially through a first data path of the service. The first network may be configured to determine whether the first user equipment should change its access network from the first network. The second network may be configured to allocate a new bearer and a second network IP address to the first user equipment when the first network requests the first user equipment to change its access network from the first network to the second network. The application server may be configured to modify the first data path based on the second network IP address and the new bearer, to form a second data path of the service through which the first user equipment and the second user equipment communicate after handoff of the service from the first network to the second network. The first data path of the service may pass through the first network and the second data path of the service may be formed to pass through the second network.

15 Claims, 5 Drawing Sheets

(56) References Cited

U.S. PATENT DOCUMENTS

| | | | |
|---|---|---|---|
| 2012/0108244 A1* | 5/2012 | Shi et al. | 455/438 |
| 2012/0127926 A1* | 5/2012 | Drevon et al. | 370/328 |
| 2012/0129508 A1* | 5/2012 | Gentry | 455/417 |
| 2012/0131663 A1* | 5/2012 | Anchan | 726/13 |
| 2012/0172042 A1* | 7/2012 | Drevon et al. | 455/436 |
| 2013/0029719 A1* | 1/2013 | Choi | H04W 4/003 455/525 |
| 2013/0122982 A1* | 5/2013 | Laor et al. | 463/16 |
| 2013/0137410 A1* | 5/2013 | Gentry | 455/417 |
| 2014/0071925 A1* | 3/2014 | Liu | H04W 28/08 370/329 |
| 2014/0086211 A1* | 3/2014 | Liu | H04L 45/38 370/331 |

FOREIGN PATENT DOCUMENTS

| | | |
|---|---|---|
| KR | 10-2009-0100000 A | 9/2009 |
| WO | WO 2008117966 A1 * | 10/2008 |

* cited by examiner

APPARATUS AND METHOD FOR SEAMLESS HANDOFF OF A SERVICE BETWEEN DIFFERENT TYPES OF NETWORKS

FIELD OF THE INVENTION

Apparatuses and methods consistent with the present invention relate to a handoff between different types of networks, and more particularly, to seamless handoff of a service from a mobile network to a wireless data network.

BACKGROUND OF THE INVENTION

User equipments can communicate with each other using an IP-based voice service provided by an IP Multimedia Subsystem (IMS) network. In order to utilize the IP-based voice service, the user equipments register their locations with the IMS network through an access network such as a mobile network or a wireless data network. The user equipments may frequently change access networks, for example, from the mobile network to the wireless data network, based on network conditions. When the access network is changed from the mobile network to the wireless data network, a seamless handoff of an IP-based voice service from the mobile network to the wireless data network is required so as not to interrupt communication between the user equipments. However, related standards of the IMS network do not guarantee service continuity of the IP-based voice service between the mobile network and the wireless data network.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a service such as an IP-based voice service may be handed off from a mobile network to a wireless data network without interrupting communication between user equipments.

In accordance with another aspect of the present invention, a data path of a service such as an IP-based voice service may be modified based on a new IP address and a new bearer allocated to a user equipment that is changing an access network.

In accordance with still another aspect of the present invention, a service such as an IP-based voice service may be seamlessly handed off from a Long Term Evolution (LTE) network to a Wireless Local Area Network (WLAN).

In accordance with an embodiment of the present invention, a system may hand off a service. The system may include a first user equipment, a second user equipment, a first network, a second network, and an application server. The first user equipment and the second user equipment may be configured to communicate with each other initially through a first data path of the service. The first network may be configured to determine whether the first user equipment should change its access network from the first network. The second network may be configured to allocate a new bearer and a second network IP address to the first user equipment when the first network requests the first user equipment to change its access network from the first network to the second network. The application server may be configured to modify the first data path based on the second network IP address and the new bearer, to form a second data path of the service through which the first user equipment and the second user equipment communicate after handoff of the service from the first network to the second network. The first data path of the service may pass through the first network and the second data path of the service may be formed to pass through the second network.

The first network may receive network information from at least one of the first user equipment and the second user equipment, and the first network may determine whether or not to change the access network of the first user equipment based on the received network information. The network information may include a list of Service Set Identifiers (SSIDs) of access points in a vicinity of at least one of the first user equipment and the second user equipment, and may also include signal strength information of the access points.

The first data path may be formed from the application server to the first user equipment through the first network, and the second data path may be formed from the application server to the first user equipment through the second network.

After the second network allocates the new bearer and the second network IP address, the application server may update a location of the first user equipment using the second network IP address, and the first data path may be modified to form the second data path based on the updated location of the first user equipment.

The first network may be a Long Term Evolution (LTE) network, the second network may be a Wireless Local Area Network (WLAN), and the application server may be included in an IP Multimedia Subsystem (IMS) network.

The LTE network may include an enhanced node B, a mobility management entity, and a packet data network gateway. The enhanced node B may be configured to receive network information from at least one of the first user equipment and the second user equipment, analyze the network information, determine whether or not the first user equipment should change its access network, create a handoff request message comprising information on the second network and handoff indication when the first user equipment is determined as needing to change its access network, transmit the handoff request message, receive a handoff command message, and forward the handoff command message to the first user equipment. The handoff command message may include information on the new bearer. The mobility management entity may be configured to receive the handoff request message from the enhanced node B, generate a relocation request message comprising data traffic information of the LTE network, transmit the relocation request message to the WLAN, receive a relocation response message comprising information on the new bearer from the WLAN, transmit the handoff command message to the first user equipment through the enhanced node B, transmit a relocation complete notify message to the WLAN in response to a handoff complete message received from the first user equipment, and receive a relocation complete ACK message from the WLAN in response to the relocation complete notify message. The packet data network gateway may be configured to receive a modify bearer request message from the WLAN and transmit a modify bearer response message to the WLAN in response to the modify bearer request message.

The WLAN may include a packet data gateway, and the packet data gateway may be configured to receive a relocation request message from a mobility management entity of the LTE network, allocate the new bearer based on information included in the relocation request message, and transmit a relocation response message including information on the WLAN and the new bearer to the mobility management entity. The packet data gateway may allocate the second network IP address of the WLAN to the first user equipment after changing the access network of the first user equipment from the LTE network to the WLAN. The packet data gateway may inform the mobility management entity of the LTE network that an initial bearer has been replaced by the new bearer when the packet data gateway receives a relocation complete notify message from the mobility management entity of the LTE network.

The IMS network may include a call session control function and an application server. The call session control function may be configured to update a location of the first user equipment based on the second network IP address and set up a session with the first user equipment using information on the new bearer. The application server may be configured to store the information on the new bearer and inform the second user equipment of the formed second data path and session set up with the first user equipment.

The first user equipment may receive the handoff command message through the enhanced node B of the LTE network, change the access network from the LTE network to the WLAN using information of the new bearer, and update a location with the IMS network using the second network IP address of the WLAN.

In accordance with another embodiment of the present invention, a service may be handed off from a first network to a second network. In order to hand off the service, a determination may be made as to whether or not a first user equipment that communicates with a second user equipment through a first data path of the service should change its access network from the first network to the second network. A new bearer and a second network IP address may be allocated to the first user equipment when the first user equipment is determined as needing to change its access network. The first data path may be modified based on the new bearer and the second network IP address, to form a second data path of the service through which the first user equipment and the second user equipment communicate after handoff of the service from the first network to the second network.

A determination as to whether or not the first user equipment should change its access network may be made based on network information regularly transmitted from at least one of the first user equipment and the second user equipment. The network information may include a list of Service Set Identifiers (SSIDs) of access points in a vicinity of at least one of the first user equipment and the second user equipment, and may also include signal strength information of the access points.

The first data path may be formed from an application server of the service to the first user equipment through the first network, and the second data path may be formed from the application server of the service to the first user equipment through the second network.

Prior to determining whether or not the first user equipment should change its access network, locations of the first user equipment and the second user equipment may be registered with the first network. Also, locations of the first user equipment and the second user equipment may be registered with an application server of a network that provides the service. Further, after registering, the first user equipment and the second user equipment may communicate with each other through the first data path formed from the application server to the first user equipment and the second user equipment through the first network.

After the determining whether or not the first user equipment should change its access network, a location of the first user equipment may be registered with the application server of the network that provides the service. The first data path may be modified to form the second data path based on the updated location of the first user equipment.

In accordance with still another embodiment of the present invention, a service may be handed off from a Long Term Evolution (LTE) network to a Wireless Local Area Network (WLAN). In order to hand off the service from the LTE network to the WLAN, a new bearer may be allocated from the WLAN to a first user equipment when the WLAN receives a handoff request message to change an access network of the first user equipment from the LTE network to the WLAN. Then, a handoff command message may be transmitted to the first user equipment to change the access network from the LTE network to the WLAN. The handoff command message may include information on the new bearer. After transmitting the handoff command message, a new IP address of the WLAN may be allocated to the first user equipment, and an IP Multimedia Subsystem (IMS) network that provides the service may be notified of a location of the first user equipment based on the new IP address. A session connection request including information on the new bearer may then be transmitted. A previous data path for providing the service may be released in response to the session connection request. Then, a new data path for providing the service may be established based on the information on the new bearer.

After the establishing the new data path, a session update request may be transmitted to second user equipment that communicates with the first user equipment using the service. Prior to allocating a new bearer from the WLAN to the first user equipment, network information may be received from the first user equipment at the LTE network and a determination may be made as to whether or not the first user equipment should change its access network from the LTE network to the WLAN based on the received network information. Then, the access network of the first user equipment may be changed from the LTE network to the WLAN in response to the handoff command message at the first user equipment. A handoff compete message may be transmitted to the LTE network after changing the access network of the first user equipment from the LTE network to the WLAN.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

Figure 1:
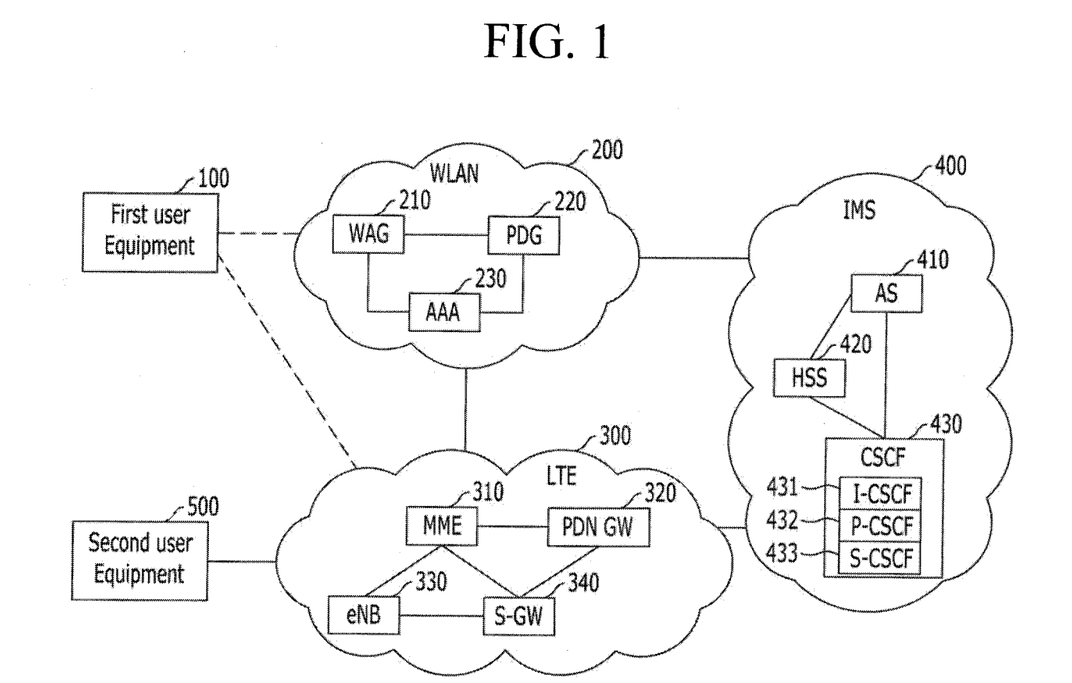
FIG. 1 illustrates a system for seamless handoff of a service such as an IP-based voice service from a mobile network to a wireless data network, in accordance with an embodiment of the present invention.

FIG. 1 illustrates a system for seamless handoff of a service such as an IP-based voice service from a mobile network to a wireless data network, in accordance with an embodiment of the present invention.

For convenience and ease of understanding, a system is representatively shown in FIG. 1 as performing a handoff from a Long Term Evolution (LTE) network 300 to a Wireless Local Area Network (WLAN) 200. The LTE network 300 and the WLAN 200 are examples of a mobile network and a wireless data network respectively, and are illustrated in FIG. 1 as having the particular configurations shown as an example only, and the present invention, is not limited thereto. A system in accordance with an embodiment of the present invention may include a plurality of types of networks, so long as at least one of the first user equipment 100 and the second user equipment 500 initially communicating through a first network of a first network type may be handed off to a second network of a second network type when the at least one of the first user equipment 100 and the second user equipment 500 enters the service area of the second network. The first network type and the second network type may each be any type of communication network or standard, so long as the first network type and the second network type are not the same.

In accordance with an embodiment of the present invention, the system may seamlessly hand off a service, such as but an IP-based voice service but not limited thereto, from a mobile network such as an LTE network 300 to a wireless data network such as a WLAN 200 while first user equipment 100 and second user equipment 500 are communicating with each other using the IP-based voice service provided by an IP multimedia subsystem (IMS) network 400. In order to seamlessly hand off the IP-based voice service, the system may allocate a new bearer from the WLAN 200 to the first user equipment 100 that needs to change an access network from the LTE network 300 to the WLAN 200. After allocating the new bearer, the system may allocate a new IP address of the WLAN 200 to the first user equipment 100. The system may update a location of the first user equipment 100 with the IMS network 400 based on the new IP address. The system may modify a previous data path from the IMS network 400 to the first and second user equipments 100 and 500 based on the new IP address and the new bearer. Hereinafter, constituent elements of the system will be described in detail with reference to FIG. 1.

Referring to FIG. 1, the system may include the WLAN 200, the LTE network 300, the IMS network 400, the first user equipment 100, and the second user equipment 500.

The WLAN 200 may include a WLAN access gateway (WAG) 210, a packet data gateway (PDG) 220, and an authentication, authorization, and accounting (AAA) server 230.

The WAG 210 may route data between the first and second user equipments 100 and 500 and the WLAN 200 in order to provide a packet switched (PS) based service. The WAG 210 may perform various security functions, including packet filtering.

The PDG 220 may perform functions for authenticating subscribers, for forming an Internet Protocol Security IPsec tunnel with user equipments, and for protecting user traffic. Furthermore, the PDG 220 may allocate an IP address to user equipments and perform functions for supporting a handoff from the LTE network 300 to the WLAN 200.

For example, the PDG 220 may allocate a new bearer for a user equipment that needs to change an access network from the LTE network 300 to the WLAN 200 in order to set up an environment of the WLAN 200 based on information in a relocation request message from the LTE network 300. The PDG 220 may create a relocation response message including information on the WLAN 200 and the new allocated bearer and transmit the relocation response message to the LTE network 300 in response to the relocation request message.

The AAA server 230 may perform functions for authentication, authorization, and accounting in order to process access of user equipments to the WLAN 200 and provide related services to user equipments.

The LTE network 300 may support mobility between different wireless access technologies. The LTE network 300 may include a mobility management entity (MME) 310, a packet data network gateway (PDN GW) 320, an enhanced node B (eNB) 330, and a serving gateway (S-GW) 340.

The eNB 330 performs functions very similar to a node B and a Radio Network Controller (RNC) of a Universal Mobile Telecommunications Service (UMTS) system. That is, the eNB 330 may manage wireless resources of the LTE network 300, control a wireless bearer, control wireless acceptance, and perform dynamic resource allocation.

The eNB 330 may receive network information transmitted from the first and second user equipments 100 and 500 and analyze the network information to determine whether or not an access network is required to be changed from the LTE network 300 to the WLAN 200. The eNB 330 may generate and transmit a handoff request message to the MME 310 based on the determination result. The handoff request message may include information on target network identity and handoff indication.

The eNB 330 may also receive a handoff command message from the MME 310 and forward the handoff command message to the first user equipment 100. The handoff command message may include the information on the new bearer.

The S-GW 340 may be an anchor point for managing mobility in the LTE network 300.

The PDN GW 320 may manage mobility in both the LTE network 300 and the WLAN 200. Although FIG. 1 shows the S-GW 340 and the PDN GW 320 as independent units, the S-GW 340 and the PDN GW 320 may be realized as one gateway unit in other embodiments of the present invention.

The PDN GW 320 may perform functions for a handoff between the LTE network 300 and the WLAN 200. For example, the PDN GW 320 may receive a modify request message from the PDG 220 of the WLAN 200. The PDN GW 320 may transmit a modify response message to the PDG 220 in response to the modify request message.

The MME 310 may be a control node in the LTE network 300. The MME 310 may perform functions for user equipment tracking and paging including retransmission, and bearer activation/deactivation.

Furthermore, the MME 310 may perform functions for supporting a handoff between different types of networks. For example, the MME 310 may receive a handoff request message from the eNB 330. In response to the handoff request message, the MME 310 may generate a relocation request message including data traffic information of the LTE network 300 and transmit the relocation request message to the WLAN 200.

The MME 310 may also receive a relocation response message including information on a new bearer allocated by the WLAN 200. The MME 310 may transmit a handoff command message to the first user equipment 100 through the eNB 330. In response to a handoff complete message, the MME 310 may also transmit a relocation complete notify message to the PDG 220 of the WLAN 200 and receive a relocation complete ACK message from the PDG 220 in response to the relocation complete notify message.

The IMS network 400 may provide a service such as an IP-based voice service to user equipments through the LTE network 300 and/or the WLAN 200 based on a session initiation protocol (SIP). The IP-based voice service may be a Voice over IP (VoIP) service. The IMS network 400 may employ a related standard defined in 3GPP. The IMS network 400 may be used as a supplementary network of a mobile communication network such as a Wideband Code Division Multiple Access (WCDMA).

As shown in FIG. 1, the IMS network 400 may include an Application Server (AS) 410, a Home Subscriber Server (HSS) 420, and a Call Session Control Function (CSCF) 430.

The CSCF 430 may perform functions related to processing calls in the IMS network 400. For example, the CSCF 430 may include an Interrogate-CSCF (I-CSCF) 431, a Proxy-CSCF (P-CSCF) 432, and a Serving-CSCF (S-CSCF) 433. The I-CSCF 431 may provide routing information for properly forwarding a call request message to a related server in an IMS domain. The P-CSCF 432 may be a first point of contact for the IMS network 400 when a user equipment accesses the IMS network 400 through an access network such as the LTE network 300. The P-CSCF 432 may also deliver a SIP register request message from a user equipment when the user equipment accesses the IMS network 400. The S-CSCF 433 may set up a call session and process a SIP message from a user equipment.

Furthermore, after the first user equipment 100 is allocated with a new IP address from the WLAN 200, the first user equipment 100 may update its location with the CSCF 430 using the new IP address. Also, the first user equipment 100 may transmit a session connection request message to the CSCF 430 in order to inform the IMS network 400 that a session is changed. The CSCF 430 may forward the session connection request message to the AS 410.

The HSS 420 may include a user database that supports entities in the IMS network 400 to process calls. The HSS 420 may store subscription-related information such as subscriber profiles, perform authentication and authorization of users, and provide information on locations of subscribers and IP information thereof. The subscriber profiles may also include information on services to which a user subscribes.

The AS 410 may collect and manage network information registered for an IP-based voice service in the LTE network 300 and the WLAN 200.

For example, the first user equipment 100 may enter a service area of the WLAN 200 while communicating with the second user equipment 500 using the IP-based voice service through the IMS network 400. In this case, the system in accordance with an embodiment of the present invention may seamlessly hand off the IP-based voice service from the LTE network 300 to the WLAN 200 while the first user equipment 100 is communicating with the second user equipment 500 using the IP-based voice service through the IMS network 400.

However, the first and second user equipments 100 and 500 may initially need to register their locations thereof with an access network and the IMS network 400 in order to receive an IP-based voice service from the IMS network 400. Hereinafter, a method for registering a location of a user equipment with an access network, for example, an LTE network, will be described with reference to FIG. 2. Although FIG. 2 shows the first user equipment 100 as registering its location with the LTE network 300, the method of FIG. 2 may be similarly applied to the second user equipment 500 when the second user equipment 500 intends to use the LTE network 300 as an access network.

Figure 2:
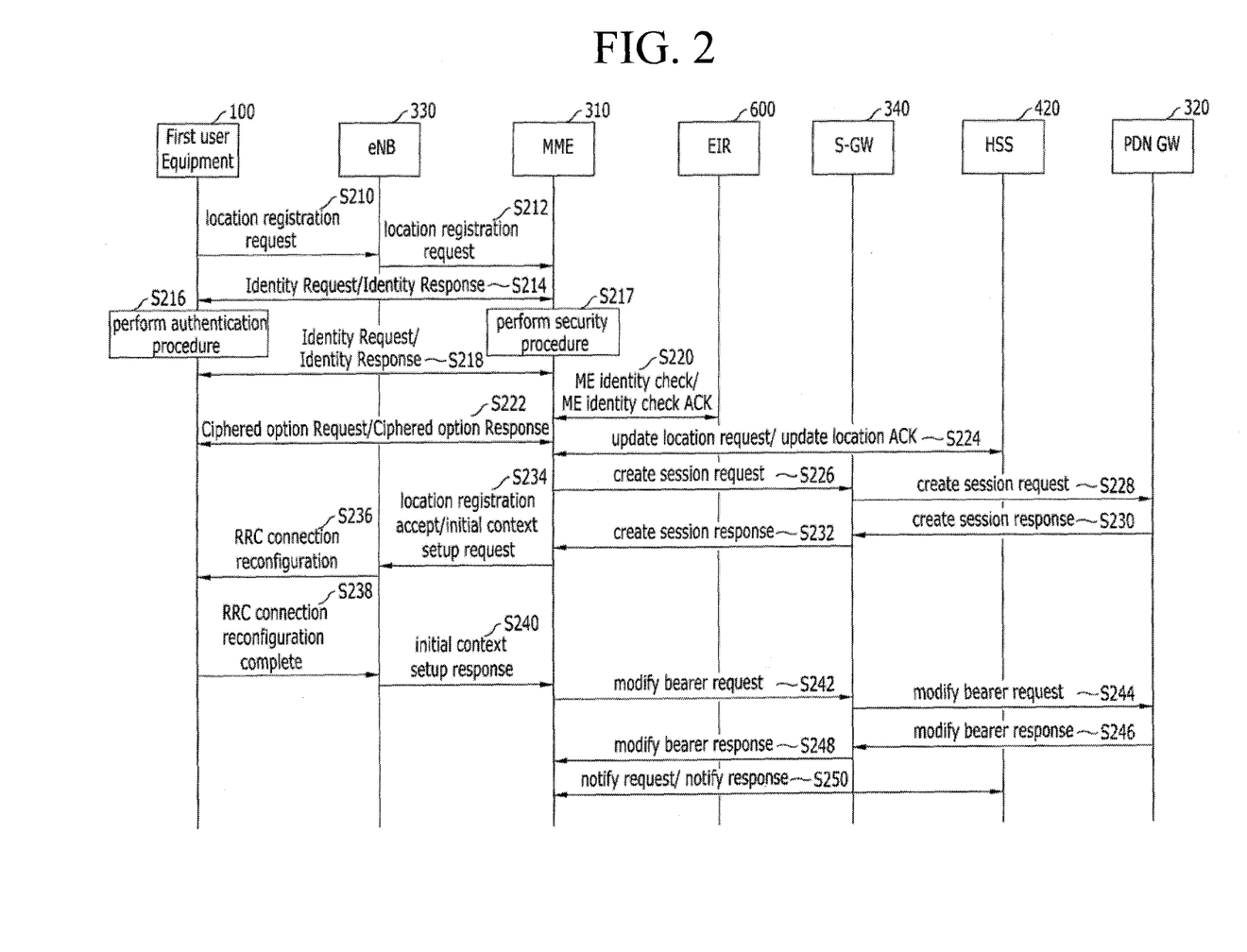
FIG. 2 illustrates a method for registering a location of a user equipment with an LTE network.

FIG. 2 illustrates a method for registering a location of a user equipment with an LTE network. Such a registration would be performed prior to, for example, receiving an IP-based call service from an IMS network.

The method for location registration with an LTE network may be initiated by transmitting a location registration request message to the LTE network 300 S210. For example, the first user equipment 100 may transmit a location registration request message to an eNB 330 of the LTE network 300. The location registration request message may include information on the LTE network and a Radio Resource Control (RRC) parameter. The RRC parameter may include an MME identity.

The location registration request message may be transmitted to an MME of the selected network based on the information included in the location registration message S212. For example, the eNB 330 may analyze the RRC parameter in the location registration request message, select the MME 310 of the LTE network 300 based on the analysis result, and forward the location registration request message to the selected MME 310.

After receiving the location registration request message, the MME 310 may request information on a subscriber identity of the user equipment 100 to the first user equipment 100 for authentication when the MME 310 does not include information on the first user equipment 100. In order to request the subscriber identity information, the MME 310 may transmit an identity request message to the first user equipment 100 and receive an identity response message from the first user equipment 100 S214. The identity response message may include a subscriber identity number.

The first user equipment 100 may perform authentication and security procedures with the MME 310 and/or the HSS 420 S216 and S217. For example, the first user equipment 100 may perform an Evolved Packet System (EPS) Authentication and Key Agreement (AKA) procedure as the authentication procedure S216, and the MME 310 may perform the security procedure with the first user equipment 100 using an NAS algorithm S217.

After the authentication and security procedures, a procedure for checking an identity of the first user equipment 100 may be performed S218 and S220.

Particularly, the MME 310 may obtain an identity type of the first user equipment 100 by transmitting an identity request message to the first user equipment 100 and receiving an identity response message from the first user equipment 100 S218. The identity response message may include a mobile identity of the first user equipment 100.

The MME 310 may transmit a mobile equipment (ME) identity check message to an equipment identity register (EIR) 600 and receive an ME identity check ACK message from the EIR 600 S220. The ME identity check message may include a mobile equipment identity and a subscriber identity number.

When the location registration request message includes a ciphered option flag setup, the MME 310 may transmit a ciphered option request message to the first user equipment 100 and receive ciphered options from the first user equipment 100 S222. The ciphered options may include at least one Protocol Configuration Option (PCO) and Access Point Name (APN).

The MME 310 may transmit an update location request message to the HSS 420 and receive a update location ACK message from the HSS 420 S224. The location update request message may include information on an MME identity, a subscriber identity, an ME identity, a capacity of a corresponding MME, and an update type.

After updating a location at the HHS 420, the MME 310 may select a S-GW 340 and allocate an EPS bearer identity to the first user equipment 100 for allocating a bearer. The MME 310 may transmit a create session request message to the selected S-GW 340 S226. The create session request message may include information on an address of a PDN GW 320, an EPS bearer quality, and an EPS bearer identity. The create session request message may further include information related to a session defined in 3GPP TS 23.401.

The S-GW 340 may create a new entry in an EPS bearer table corresponding to the create session request message and transmit the create session request message to the PDN GW 320 S228. The S-GW 340 may transmit the create session request message to the PDN GW 320 using a PDN GW address included in the create session request message received from the MME 310.

The PDN GW 320 may create a new entry at an EPS bearer context table, create identity information for accounting, and transmit a create session response message to the S-GW 340 S230. The PDN GW 320 may route between the S-GW 340 and a packet date network due to the new entry.

The S-GW 340 may transmit a create session response message to the MME 310 S232.

The MME 310 may generate a location registration accept message and transmit the location registration accept message to the eNB 330 S234. The MME 310 may also transmit an initial context setup request message to the eNB 330 using an MME control message.

After receiving the location registration accept message, the eNB 330 may transmit an RRC connection reconfiguration message to the user equipment 100 S236. The RRC connection reconfiguration message may include an EPS bearer identity allocated to the first user equipment 100. The eNB 330 may transmit the location registration accept message to the first user equipment 100 together with the RRC connection reconfiguration message.

The first user equipment 100 may transmit an RRC connection reconfiguration complete message to the eNB 330 S238.

Accordingly, the eNB 330 may transmit an initial context setup response message to the MME 310 S240.

After receiving the initial context setup response message, the MME 310 may transmit a modify bearer request message to the S-GW 340 S242. The modify bearer request message may include an EPS bearer identity, an eNB address, and handoff indication.

When the modify bearer request message includes the handoff indication, the S-GW 340 may transmit the modify bearer request message to the PDN GW 320 S244. A packet tunneling performance from a wireless data network to a mobile network may be maximized by utilizing the modify bearer request message.

After receiving the modify bearer request message, the PDN GW 320 may transmit a modify bearer response message to the S-GW 340 S246. The S-GW 340 may forward the modify bearer response message to the MME 310 S248.

The MME 310 may transmit a notify request message to the HSS 420 and receive a notify response message from the MME 310 S250. The notify request message may include an APN and a PDN GW identity in order to support mobility between a mobile network and a wireless data network.

As described above, the first user equipment 100 registers its location with the LTE network 300 in order to receive an IP-based voice service from the IMS network 400. After registering its location with the LTE network 300, the first user equipment 100 may then register its location with the IMS network 400. Hereinafter, a method for registering a location of a user equipment with an IMS network will be described with reference to FIG. 3. Although FIG. 3 shows the first user equipment 100 registering its location with the IMS network, the method of FIG. 3 may be similarly applied to the second user equipment 500 when the second user equipment 500 intends to use an IP-based voice service through the IMS network.

Figure 3:
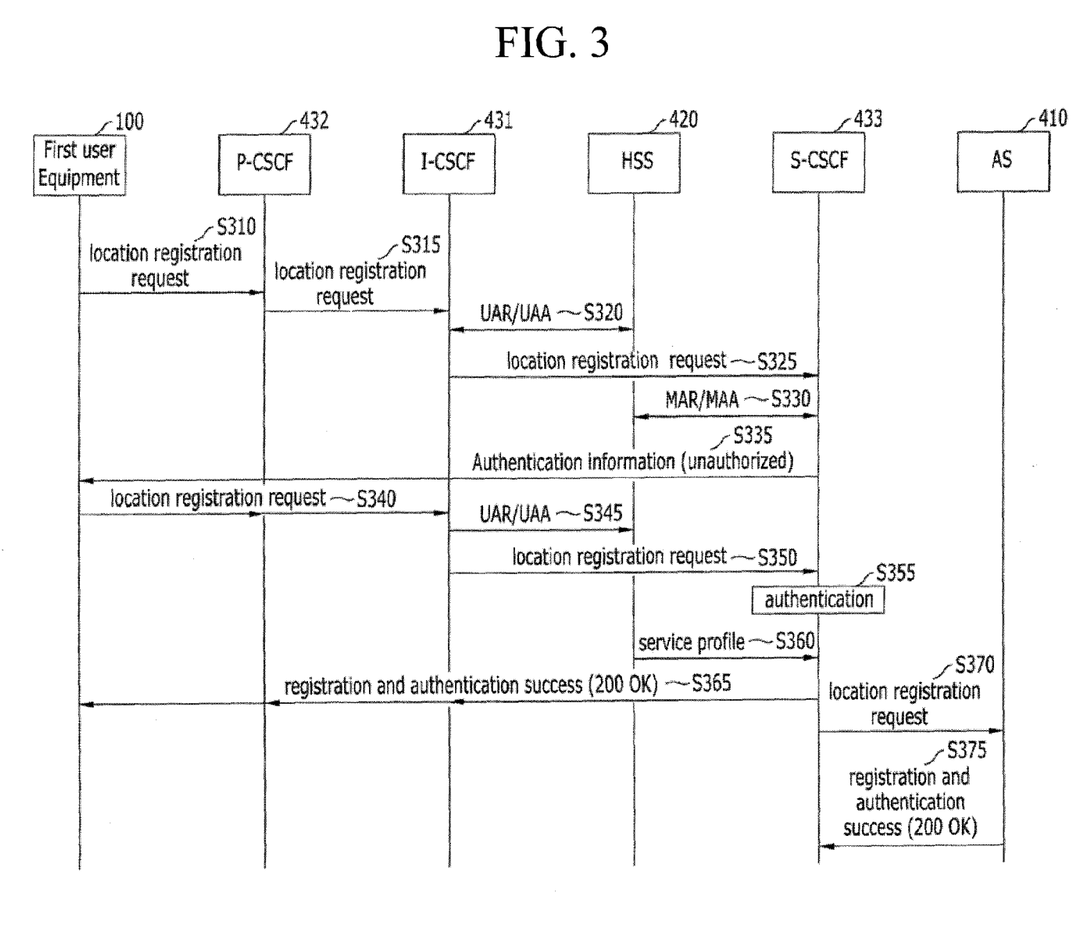
FIG. 3 illustrates a method for registering a location of a user equipment with an IP Multimedia System (IMS) network after registering the location with an LTE network.

FIG. 3 illustrates a method for registering a location of a user equipment with an IMS network after registering the location with an LTE network. After registration, an IP-based voice service may be received from the IMS network.

The method for location registration with an IMS network may be initiated by transmitting a location registration request message from a first user equipment 100 to an IMS network 400 S310. For example, the first user equipment 100 may generate and transmit a location registration request message to a P-CSCF 432 of the IMS network 400. The location registration request message may include information on the first user equipment 100 and an access network that the first user equipment 100 currently uses, which would be the LTE network 300 in this case.

The P-CSCF 432 may forward the location registration request message to a corresponding I-CSCF 431 based on information in the location registration request message S315. The information may be a domain of a subscriber.

The I-CSCF 431 may inquire of the HSS 420 and select a S-CSCF 433 to register the first user equipment 100 based on the inquiry result S320. For example, the I-CSCF 431 may transmit a User Authorization Request (UAR) message to the HSS 420 in order to request the S-CSCF 433 to register the first user equipment 100. The I-CSCF 431 receives an User Authorization Answer (UAA) message from the HSS 420. The UAA message may include information on the S-CSCF 433 to register the first user equipment 100.

The I-CSCF 431 may transmit a location registration request message to the selected S-CSCF 433 S325.

The S-CSCF 433 may request the HSS 420 for authentication information in order to authenticate the first user equipment 100 and receive the authentication information from the HSS 420 S330. For example, the S-CSCF 433 may transmit a Multimedia Authentication Request (MAR) message to the HSS 420. In response to the MAR message, the HSS 140 may transmit a Multimedia Authentication Answer (MAA) message to the S-CSCF 433. The MAA message may include authentication information including an authentication vector.

After obtaining authentication information, the S-CSCF 433 may transmit the authentication information to the first user equipment 100 S335. The authentication information may be a message of "unauthorized." Also, the authentication information may include the authentication vector.

The user equipment 100 may perform authentication based on the authentication vector included in the authentication information, insert the authentication result into a location registration request message, and transmit the location registration request message again to the I-CSCF 431 through the P-SCSF 432 S340.

The I-CSCF 431 may be allocated with the S-CSCF 433 for registering the first user equipment 100 S345 by transmitting the UAR message to the HSS 420 and receiving the UAA message from the HSS 420.

The I-CSCF 431 may transmit the location registration request message to the S-CSCF 433 S350. The location registration request message may include the authentication result.

After receiving the location registration request message, the S-CSCF 433 may authenticate the first user equipment 100 using the authentication result included in the location registration request message S355. The first user equipment 100 may be registered at the IMS network 400 when the first user equipment 100 is successfully authenticated.

The S-CSCF 433 may obtain a service profile corresponding to the user equipment 100 from the HSS 420 S360.

The S-CSCF 433 may inform the first user equipment 100 of location registration success and authentication success S365. For example, the S-CSCF 433 may transmit a registration and authentication success message (200 OK) to the first user equipment 100 through the I-CSCF 431 and the P-CSCF 432.

The S-CSCF 433 may transmit a location registration request message to the AS 410 S370. The location registration request message may include information on an access network that the first user equipment 100 uses, which would be the LTE network 300 in this case.

The AS 410 may store the information corresponding to the first user equipment 100 and transmit the authentication and registration success message (200 OK) to the S-CSCF 433 S375.

As described above, the first user equipment 100 registers its location with the IMS network 400 after registering with the LTE network 300. Accordingly, the first user equipment 100 may receive an IP-based voice service from the IMS network 400 through the LTE network 300.

The second user equipment 500 also may receive the IP-based voice service from the IMS network 400 after registering its location with the LTE network 300. Using such an IP-based voice service, the first user equipment 100 may communicate with the second user equipment 500 through a data path formed between the IMS network 400 and the first and second user equipments 100 and 500 through the LTE network 300. While communicating through the data path of the IP-based voice service, one of the user equipments 100 and 500 may need to perform a handoff from the LTE network 300 to a wireless data network such as the WLAN 200. In accordance with an embodiment of the present invention, an IP-based voice service may be seamlessly handed off from a mobile network to a wireless data network without interrupting communication between the first and second user equipments 100 and 500. Hereinafter, a method for handing off a service such as an IP-based voice service from a mobile network to a wireless data network in accordance with an embodiment of the present invention will be described with reference to FIG. 4.

Figure 4:
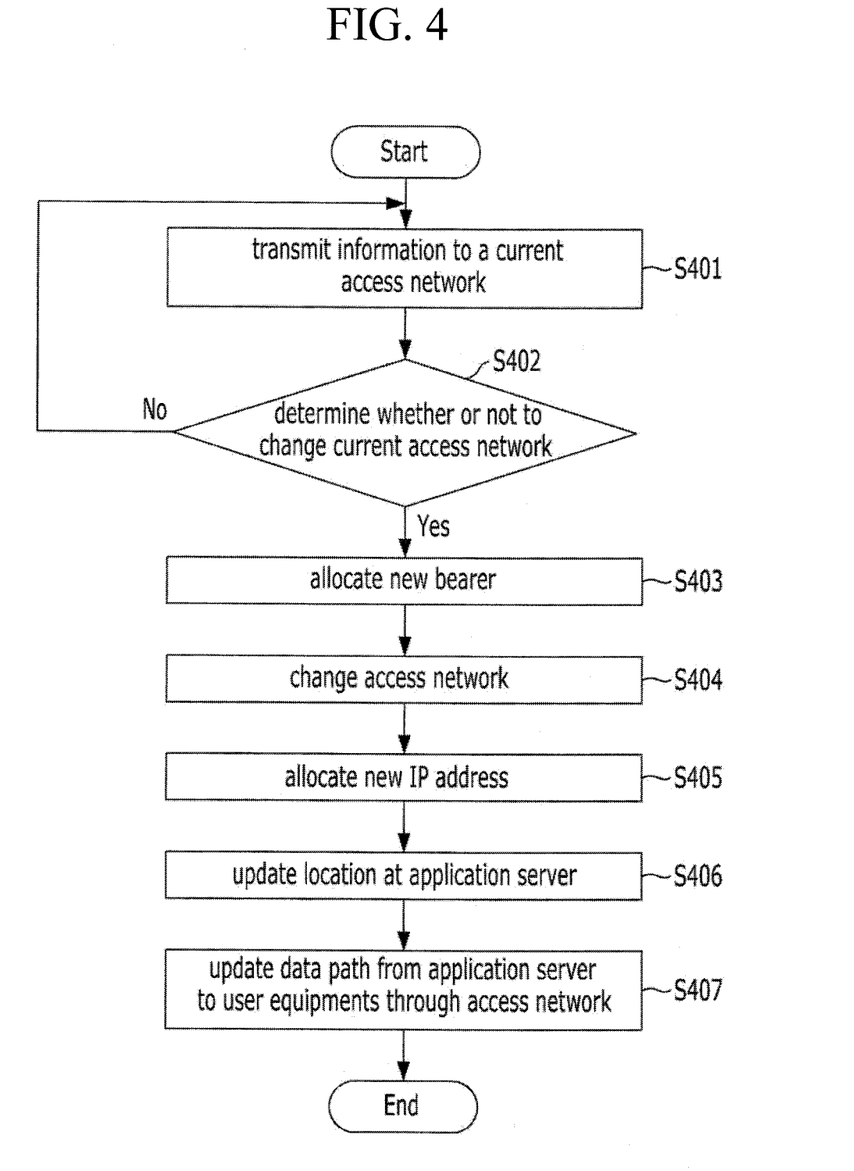
FIG. 4 illustrates a method for seamless handoff of a service such as an IP-based voice service from a mobile network to a wireless data network, in accordance with an embodiment of the present invention.

FIG. 4 illustrates a method for seamless handoff of a service such as an IP-based voice service from a mobile network to a wireless data network, in accordance with an embodiment of the present invention.

After user equipments register their locations with a mobile network and an application server of an IP-based voice service, a data path may be formed between the application server and the user equipments for communicating using the IP-based voice service. Under some network conditions, one of the user equipments may need to change an access network while communicating with the other user equipment using the IP-based voice service. In this case, it may be necessary to modify the data path for the IP-based voice service. In accordance with an embodiment of the present invention, the IP-based voice service may be seamlessly handed off by modifying the data path between the application server and the user equipments through an access network when one of the user equipments in communication changes access networks.

Referring to FIG. 4, network information may be transmitted to a current access network while user equipments are communicating with each other using an IP-based voice service S401. For example, first and second user equipments may regularly transmit network information to a mobile network that is a current access network. The network information may be information on strength of signals transmitted from different types of neighboring networks. Furthermore, the network information may be a list of service set identifiers (SSID) of neighboring access points. In this case, the user equipments may collect SSIDs of neighboring access points having proper signal strength and regularly transmit a list of SSIDs to the mobile network.

Based on the network information, a determination may be made as to whether or not one of user equipments needs to change an access network S402. For example, when the first user equipment enters a service area of a wireless data network, the mobile network may determine that the first user equipment should change the current access network from the mobile network to the wireless data network. Such a determination may be made based on various criteria. For example, when an available access point of the wireless data network is located in the vicinity of the first user equipment, the mobile network may determine that the first user equipment needs to change the current access network. Furthermore, when a signal strength of a wireless data network in the vicinity of the first user equipment is stronger than that of the current access network such as the mobile network, the mobile network may determine that the first user equipment should change the current access network to the wireless data network.

When it is determined that one of the first and second user equipments should change the current access network (S402-Yes), a new bearer may be allocated S403. For example, the mobile network may request the wireless data network to allocate a new bearer from the wireless data network to the first user equipment. In response to the request, the wireless data network may allocate the new bearer for the first user equipment and inform the mobile network of the new bearer allocation.

After allocating the new bearer, the current access network may be changed S404. For example, the mobile network may instruct the first user equipment to change the current access point from the mobile network to the wireless data network.

After changing the current access network, a new IP address of the wireless data network may be allocated S405. For example, the wireless data network may allocate a new IP address to the first user equipment.

A location of the first user equipment may be updated at an application server of the IP-based voice service S406. For example, the first user equipment may update its location in the wireless data network at the application server using the new IP address.

A data path between the user equipments may be modified based on the new IP address and the new bearer S407. For example, the application server may modify the previous data path formed from the application server to the first and second user equipments through the mobile network to a new data path formed from the application server to the first and second user equipments through the wireless data network.

In accordance with an embodiment of the present invention, the user equipments can seamlessly communicate with each other using the IP-based voice service even when one of the user equipments changes an access network during communication using the IP-based voice server, as described above. Hereinafter, the method in accordance with an embodiment of the present invention will be described in more detail with reference to FIG. 5.

Figure 5:
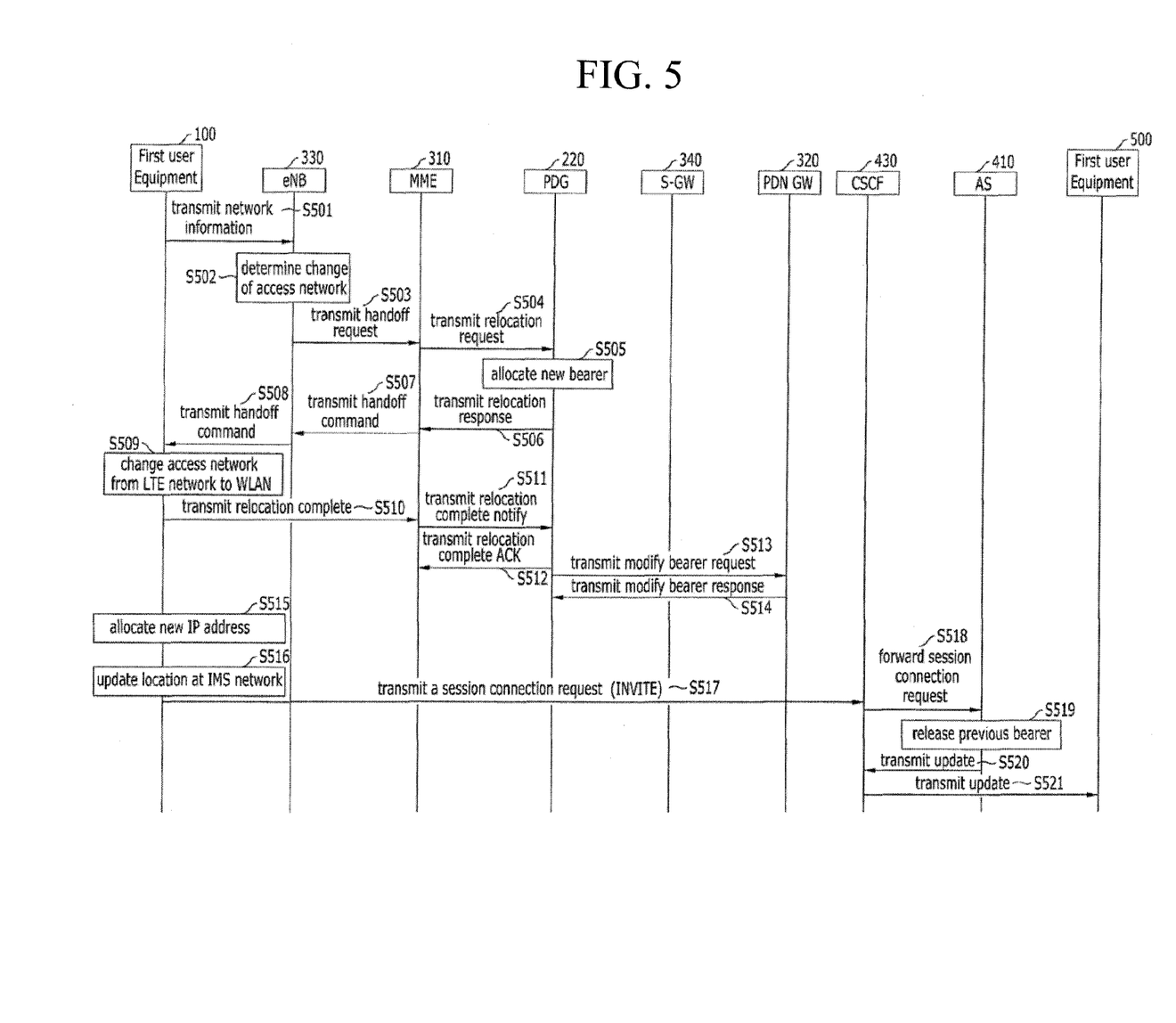
FIG. 5 illustrates a method for seamless handoff of a Voice over IP (VoIP) service from an LTE network to a WLAN, in accordance with an embodiment of the present invention.

FIG. 5 illustrates a method for seamless handoff of a Voice over IP (VoIP) service from an LTE network to a WLAN, in accordance with an embodiment of the present invention.

Referring to FIG. 5, first and second user equipments 100 and 500 may transmit network information to an eNB 330 of an LTE network 300 S501. The network information may be regularly transmitted from the first and second user equipments 100 and 500 to the eNB 330 of the LTE network 300. The network information may include any of information about a condition of neighboring networks, strength of signals transmitted from neighboring networks, and traffic load of neighboring networks. Furthermore, the network information may be a list of SSIDs of neighboring access points, which are collected by the first and second user equipments 100 and 500.

The eNB 330 may determine whether or not one of the first and second user equipments 100 and 500 need to change an access network from the LTE network 300 to the WLAN 200 S502. In order to make this determination, the eNB 330 may analyze the received network information. Based on the analysis result, the eNB 330 may determine whether or not the first user equipment 100 leaves a service area of the LTE network 300, whether or not the first user equipment 100 enters into a service area of the WLAN 200, and/or whether or not a strength of a signal from the LTE network 300 is weaker than that of a signal from the WLAN 200. For example, when the first user equipment 100 leaves the service area of the LTE network 300 and enters the service area of the WLAN 200, the eNB 330 may determine that the first user equipment 100 should change an access network from the LTE network 300 to the WLAN 200.

The eNB 330 may generate and transmit a handoff request message to the MME 310 S503. The handoff request message may include information on a target network identity and handoff indication. The target network identity may be an identity of the WLAN 200.

When the MME 310 of the LTE network 300 receives the handoff request message, the MME 310 may generate and transmit a relocation request message to the PDG 220 of the WLAN 200 S504. For example, the relocation request message may include data traffic information on a previous session created between the first user equipment 100 and the LTE network 300. Accordingly, the MME 310 may transmit the data traffic information using the relocation request message to the PDG 220 in order to set up an environment of the WLAN 200 for handing off data traffic from the LTE network 300 to the WLAN 200.

In response to the relocation request message, the PDG 220 may allocate a new bearer from the WLAN 200 to the first user equipment 100 based on the data traffic information in the relocation request message S505. That is, an environment of the WLAN 200 may be set up based on the data traffic information in the relocation request message in order to form a communication link between the first user equipment 100 and the WLAN 200. The PDG 220 may also transmit a relocation response message to the MME 310 in response to the relocation request message S506. The relocation response message may include information on the new bearer. Furthermore, the information on the new bearer may be included in a target_to_source_transparent_container defined in 3GPP TS 29.280 and transmitted to the MME 310.

The MME 310 may transmit a handoff command message to the eNB 330 S507. The eNB 330 may forward the handoff command message to the first user equipment 100 S508. The handoff command message may include the information on the new bearer.

In response to the handoff command message, the first user equipment 100 may change an access network from the LTE network 300 to the WLAN 200 based on the new bearer information S509.

After changing the access network, the first user equipment 100 may generate a relocation complete message and transmit the generated relocation complete message to the MME 310 S510.

In response to the relocation complete message, the MME 310 may transmit a relocation complete notify message to the PDG 220 of the WLAN 200 S511 and receive a relocation complete ACK message from the PDG 220 in response to the relocation complete notify message S512.

The PDG 220 of the WLAN 200 may transmit a modify bearer request message to a PDN GW 320 of the LTE network 300 in order to inform the LTE network 300 that a data path between the first and second user equipments 100 and 500 has been changed S513. The PDN GW 320 may transmit a modify bearer response message to the PDG 220 in response to the modify bearer request message S514.

The first user equipment 100 may then be allocated with a new IP address of the WLAN 200 S515. After allocating the new IP address, the first user equipment 100 may update its location at the CSCF 430 of the IMS network 400 using the new IP address S516.

After registering the location, the first user equipment 100 may transmit a session connection request message such as an INVITE message to the CSCF 430 in order to inform the IMS network 400 of a session change S517. The session connection request message may include information on the new bearer allocated for the first user equipment 100 from the WLAN 200.

The CSCF 430 may forward the session connection request message to the AS 410 S518.

The AS 410 may release a previous bearer of the first user equipment 100 between the LTE network 300 and the first user equipment 100 and store information on the new bearer S519.

The AS 410 may transmit an update message to the CSCF 430 S520. The CSCF 430 may forward the update message to the second user equipment 500 S521 in order to inform the second user equipment 500 that the data path is changed based on the new bearer.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system for seamlessly handing off an Internet Protocol (IP) based voice service between a mobile network and a wireless data network during the IP based voice service is provided by an application server, the system comprising:

a first user equipment and a second user equipment configured to communicate with each other initially through a first data path of the IP based voice service;

a mobile network configured to determine whether the first user equipment should change its access network from the mobile network;

a wireless data network configured to allocate a new bearer and a wireless data network IP address to the first user equipment when the mobile network requests the first user equipment to change its access network from mobile network to the wireless data network while the first user equipment is communicating with the second user equipment through the first data path of the IP based voice service; and an application server configured to modify the first data path based on the wireless data network IP address of the first user equipment and the new bearer during providing the IP based voice service to the first user equipment and the second user equipment, to form a second data path of the service through which the first user equipment and the second user equipment communicate after handoff of the IP based voice service from the mobile network to the wireless data network, wherein the first data path of the service passes through the mobile network and the second data path of the IP based voice service is formed to pass through the wireless data network, and wherein i) a packet data gateway of the wireless data network allocates the new bearer and the wireless data network IP address to the first user equipment as result of the handoff the first user equipment from the mobile network to the wireless data network, and ii) the application server receives a request message from the first user equipment with the allocated wireless data network IP address, updates a location of the first user equipment using the received wireless data network IP address in response to the request message, and modifies the first data path to form the second data path based on the updated location of the first user equipment while providing the IP based voice service to the first user equipment and the second user equipment, wherein the mobile network is a Long Term Evolution (LTE) network, the wireless data network is a Wireless Local Area Network (WLAN), and the application server is included in an IP Multimedia Subsystem (IMS) network, wherein the WLAN comprises a packet data gateway configured to receive a relocation request message from a mobility management entity of the LTE network, allocate the new bearer based on information included in the relocation request message, and transmit a relocation response message including information on the WLAN and the new bearer to the mobility management entity, and wherein the packet data gateway allocates the wireless data network IP address of the WLAN to the first user equipment after changing the access network of the first user equipment from the LTE network to the WLAN.

2. The system of claim 1, wherein:

the mobile network receives network information from at least one of the first user equipment and the second user equipment, and the mobile network determines whether or not to change the access network of the first user equipment based on the received network information, and the network information comprises:

a list of Service Set Identifiers (SSIDs) of access points in a vicinity of at least one of the first user equipment and the second user equipment; and signal strength information of the access points.

3. The system of claim 1, wherein the first data path is formed from the application server to the first user equipment through the mobile network, and the second data path is formed from the application server to the first user equipment through the wireless data network.

4. The system of claim 1, wherein the LTE network comprises:

an enhanced node B configured to receive network information from at least one of the first user equipment and the second user equipment, analyze the network information, determine whether or not the first user equipment should change its access network, create a handoff request message comprising information on the wireless data network and handoff indication when the first user equipment is determined as needing to change its access network, transmit the handoff request message, receive a handoff command message, and forward the handoff command message to the first user equipment, wherein the handoff command message comprises information on the new bearer;

a mobility management entity configured to receive the handoff request message from the enhanced node B, generate a relocation request message comprising data traffic information of the LTE network, transmit the relocation request message to the WLAN, receive a relocation response message comprising information on the new bearer from the WLAN, transmit the handoff command message to the first user equipment through the enhanced node B, transmit a relocation complete notify message to the WLAN in response to a handoff complete message received from the first user equipment, and receive a relocation complete ACK message from the WLAN in response to the relocation complete notify message; and a packet data network gateway configured to receive a modify bearer request message from the WLAN and transmit a modify bearer response message to the WLAN in response to the modify bearer request message.

5. The system of claim 1, wherein the packet data gateway informs the mobility management entity of the LTE network that an initial bearer has been replaced by the new bearer when the packet data gateway receives a relocation complete notify message from the mobility management entity of the LTE network.

6. The system of claim 1, wherein the IMS network comprises:

a call session control function configured to receive the request message from the first user equipment with the allocated wireless data network IP address and transmit the received request message with the allocated wireless data network IP address to the application server in order to update a location of the first user equipment at the application server based on the allocated wireless data network IP address and to set up a session with the first user equipment using information on the new bearer; and the application server configured to receive the request message with the allocated wireless data network IP address of the first user equipment, store the information on the new bearer, and inform the second user equipment of the formed second data path and session set up with the first user equipment in order to seamlessly provide the IP based voice server to the first user equipment and the second user equipment.

7. The system of claim 4, wherein the first user equipment receives the handoff command message through the enhanced node B of the LTE network, changes the access network from the LTE network to the WLAN using information of the new bearer, and updates a location with the IMS network using the wireless data network IP address of the WLAN.

8. A method for seamlessly handing off an Internet Protocol (IP) based voice service from a mobile network to a wireless data network during providing the IP based voice service by an application server, the method comprising:

providing, by an application server, the IP based voice service to a first user equipment and a second user equipment to communicate with each other through a first data path of the IP based voice service;

determining, by a mobile network, whether or not the first user equipment that communicates with the second user equipment through the first data path of the IP based voice service should change its access network from the mobile network to the wireless data network while the first user equipment is communicating with the second user equipment through the first data path of the service;

allocating, by a packet data gateway of a wireless data network, a new bearer and a wireless data network IP address to the first user equipment when the first user equipment is determined as needing to change its access network during the service is provided through the first data path of the service; and receiving, by the application server, a request message with the allocated wireless data network IP address from the first user equipment, updating, a location of the first user equipment based on the allocated wireless data network IP address of the first user equipment, modifying the first data path based on the new bearer and the wireless data network IP address of the first user equipment, to form a second data path of the service through which the first user equipment and the second user equipment communicate, wherein the mobile network is a Long Term Evolution (LTE) network, the wireless data network is a Wireless Local Area Network (WLAN), and the application server is included in an IP Multimedia Subsystem (IMS) network, wherein, the allocating includes, by a packet data gateway of the WLAN, receiving a relocation request message from a mobility management entity of the LTE network, allocating the new bearer based on information included in the relocation request message, and transmitting a relocation response message including information on the WLAN and the new bearer to the mobility management entity, and wherein the packet data gateway allocates the wireless data network IP address of the WLAN to the first user equipment after changing the access network of the first user equipment from the LTE network to the WLAN.

9. The method of claim 8, wherein:

whether or not the first user equipment should change its access network is determined based on network information regularly transmitted from at least one of the first user equipment and the second user equipment, and the network information comprises a list of Service Set Identifiers (SSIDs) of access points in a vicinity of at least one of the first user equipment and the second user equipment, and signal strength information of the access points.

10. The method of claim 8, wherein the first data path is formed from the application server of the IP based voice service to the first user equipment through the mobile network, and the second data path is formed from the application server of the IP based voice service to the first user equipment through the wireless data network.

11. The method of claim 8, prior to determining whether or not the first user equipment should change its access network, the method further comprising:

registering locations of the first user equipment and the second user equipment with the mobile network;

registering locations of the first user equipment and the second user equipment with an application server of a network that provides the service; and communicating between the first user equipment and the second user equipment through the first data path formed from the application server to the first user equipment and the second user equipment through the mobile network.

12. The method of claims 11, after the determining whether or not the first user equipment should change its access network, the method further comprising:

updating a location of the first user equipment with the application server of the network that provides the IP based voice service, wherein the first data path is modified to form the second data path based on the updated location of the first user equipment.

13. A method for seamlessly handing off an Internet Protocol (IP) based voice service from a Long Term Evolution (LTE) network to a Wireless Local Area Network (WLAN) using the IP based voice service is provided by an application server, the method comprising:

providing, by an application server, the IP based voice service to a first user equipment and a second user equipment for communication between the first user equipment and the second user equipment;

allocating a new bearer from the WLAN to the first user equipment when the WLAN receives a handoff request message to change an access network of the first user equipment from the LTE network to the WLAN during providing the IP based voice service to the first user equipment and the second user equipment;

transmitting a handoff command message to the first user equipment to change the access network from the LTE network to the WLAN, wherein the handoff command message comprises information on the new bearer;

allocating, by a packet data gateway of the WLAN, a new IP address of the WLAN to the first user equipment during communicating with the second user equipment through the service of the application server;

receiving by the application server a request message with the allocated new IP address of the WLAN from the first user equipment, and updating by the application server a location of the first user equipment based on the new IP address of the first user equipment;

establishing a new data path for providing the IP based voice service, based on the information on the new bearer and the new IP address of the first user equipment and continuously providing the IP based voice service through the new data path, wherein the allocating comprises, by the packet data gateway of the WLAN, receiving a relocation request message from a mobility management entity of the LTE network, allocating the new bearer based on information included in the relocation request message, and transmitting a relocation response message including information on the WLAN and the new bearer to the mobility management entity, and wherein the packet data gateway allocates the wireless data network IP address of the WLAN to the first user equipment after changing the access network of the first user equipment from the LTE network to the WLAN.

14. The method of claim 13, after the establishing the new data path, the method further comprising:

transmitting a session update request to a second user equipment that communicates with the first user equipment using the IP based voice service.

15. The method of claim 13, further comprising:

prior to allocating a new bearer from the WLAN to the first user equipment, receiving network information from the first user equipment at the LTE network and determining whether or not the first user equipment should change its access network from the LTE network to the WLAN based on the received network information;

changing the access network of the first user equipment from the LTE network to the WLAN in response to the handoff command message at the first user equipment; and transmitting a handoff compete message to the LTE network after changing the access network of the first user equipment from the LTE network to the WLAN.

\* \* \* \* \*